(No Model.)

A. H. COPE.
ALMOND SHELLER.

No. 567,736.   Patented Sept. 15, 1896.

Witnesses,

Inventor,
Alvinza H. Cope
By Davey & Co.
Attys

UNITED STATES PATENT OFFICE.

ALVINZA H. COPE, OF DANVILLE, CALIFORNIA.

ALMOND-SHELLER.

SPECIFICATION forming part of Letters Patent No. 567,736, dated September 15, 1896.

Application filed February 13, 1896. Serial No. 579,161. (No model.)

*To all whom it may concern:*

Be it known that I, ALVINZA H. COPE, a citizen of the United States, residing at Danville, county of Contra Costa, State of California, have invented an Improvement in Almond-Shellers, and I hereby declare the following to be a full, clear, and exact description of the same.

My invention relates to the class of devices for shelling nuts of various kinds, and especially for shelling almonds.

My invention consists in the novel construction, arrangement, and combination of parts which I shall hereinafter fully describe and claim.

The object of my invention is to provide a machine which, while adapted for the shelling of various nuts, is especially adapted for the shelling of almonds, in which use its particular advantages are its adaptability to shell almonds whether or not the hull remains fast to the shell, the rapidity with which the nuts may be shelled, and the small number of kernels mutilated in the shelling process.

Figure 1:
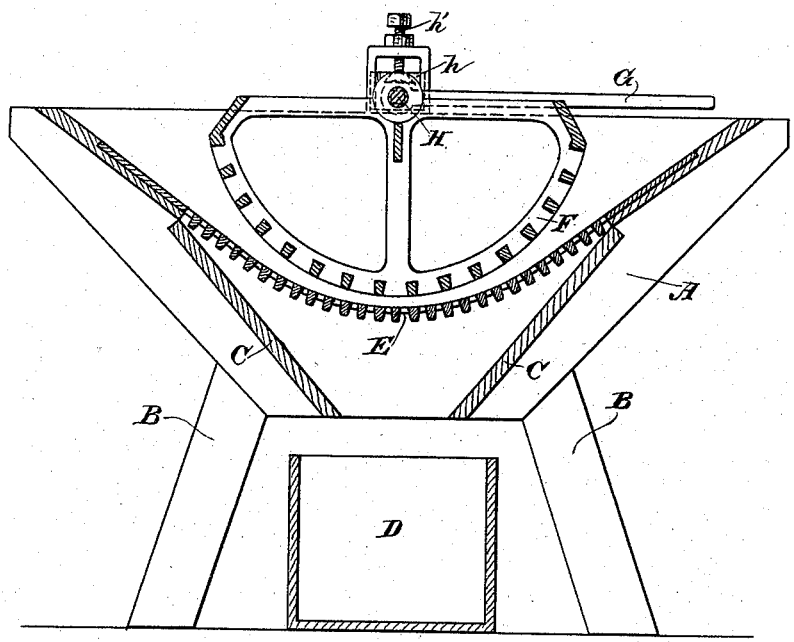
Figure 2:
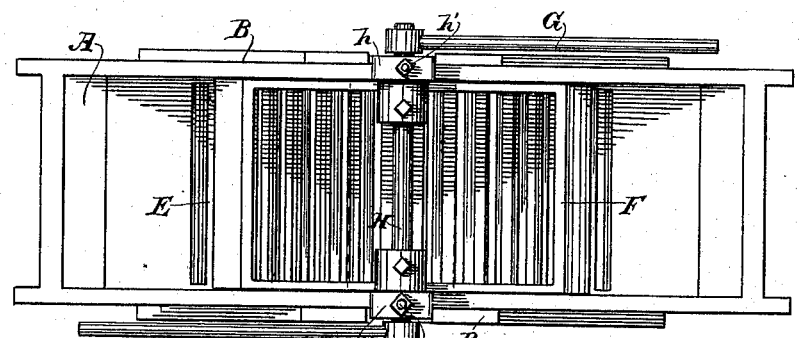

Referring to the accompanying drawings, Figure 1 is a vertical longitudinal section of my almond-sheller. Fig. 2 is a top view of same.

A is a casing supported by a suitable frame or legs B, said casing having a wide open top, and also having an open bottom. In the lower portion of said casing are directing-plates C, forming a hopper or chute by which the shelled almonds are discharged into the underlying box or receptacle D. Within the casing A, just above chute C, is a concave grating E, formed of suitably-spaced bars. Above this grating is a convex rubber F, adapted to be oscillated by suitable means, as by the handles G, one on each end of the shaft and oppositely extending. This rubber consists of suitably-spaced bars, and the curvature of the rubber is greater than that of the fixed grating E, so that flaring entrances are left on each side, from which the space between the rubber and grating gradually decreases to the central point.

The rubber is mounted upon a rock-shaft H, to which the handles G are attached, and said rock-shaft is itself mounted in sliding boxes $h$, with which are connected adjusting-screws $h'$, by the operation of which the rubber may be set closer to or farther away from the fixed grating E to suit the necessities of the case. The bars constituting the fixed grating E and those forming the grating of the rubber, though they may be made of any suitable material, are preferably made of iron, so that the machine is a durable one, and its crushing or breaking parts are sufficiently strong to effect the object intended of cracking the shells of the almonds. The bars which compose the two gratings may be of any suitable shape in cross-section, but I have found that the preferable shape is that here shown, namely, the bars of the grating E having flat tops, and thence having downwardly converging sides, whereby a downwardly-flaring discharge-space is formed to prevent clogging, and the bars of the rubber grating also have downwardly-converging sides to provide for flaring spaces, which, while permitting any almonds fed into the rubber to readily pass down into the crushing-space, will prevent them from rising again between the bars. The bars of the two gratings are set at any distance apart, and the bars of each may be set at the same distance apart, but I have found that in working with soft-shelled nuts the best arrangement is to have the bars of the rubber grating set at a greater distance apart than are the bars of the fixed grating E, but for hard-shelled nuts the bars of the rubber grating should be set closer together, so as to avoid the liability of any of the nuts working their way up through the bars.

The almonds may be fed directly into the rubber and pass down between its bars into crushing-space, or they may be fed into the widened spaces at each end between the rubber and fixed grating, and in either case entering the crushing-space they are affected by the oscillation of the rubber, so that between the two gratings the shells are crushed and cracked and the nuts worked down toward the center and lower portion of the casing, where the kernels and shells drop through and are directed by the guide-plates C into the receptacle D beneath.

The almonds may be fed to the machine either with their hulls on or off, though the intention of the machine is to operate upon nuts which are already hulled and have simply the shells on, but in many cases, and especially in those imperfectly-formed almonds known as "stick-tights," the hulls may be on and the machine will crack both hulls and shells, thus freeing the kernels.

Having thus described my invention, what I claim as new, and desire to secure by Letters Patent, is—

1. A machine for shelling almonds and other nuts consisting of a casing open at top and bottom, a concaved grating formed of a series of parallel spaced metal bars having wide flat tops and tapering sides, forming downwardly-diverging spaces between adjacent bars, a rubber or grating over said concave, having a curvature greater than that of the latter and having parallel spaced bars with flat bottoms and inclined sides, said bars of the rubber and concave adapted to split the shells of the nuts by the opposing crushing action of the edges formed along the bars at the junction of the inclined sides with the flat tops and bottoms.

2. An improved almond-sheller consisting of a frame open at top and bottom and having oppositely-inclined directing-plates in its lower side, a grating over said plates and consisting of a series of transverse metal bars having flat tops and inclined sides, forming crushing edges at the junction of the tops and sides, an oscillating rubber within the frame, above the grating, and having similarly-constructed crushing-bars with crushing edges opposing those on the concave, said rubber having a curvature greater than that of the concave, to provide outwardly-flaring spaces in which the almonds are crowded during the oscillations of the rubber, a shaft on which the rubber grating is mounted, vertically-adjustable boxes for the shaft, for adjusting the rubber closer to or farther from the concave, and oppositely-extending levers, one on each side of the shaft, for oscillating the rubber.

In witness whereof I have hereunto set my hand.

ALVINZA H. COPE.

Witnesses:
S. F. RAMAGE,
A. R. COPE.